United States Patent [19]
Primeau

[11] Patent Number: 5,482,759
[45] Date of Patent: Jan. 9, 1996

[54] REVERSIBLE AUTOMOBILE FLOOR MAT

[75] Inventor: Mario Primeau, St-Léonard, Canada

[73] Assignee: Promotions Atlantiques Inc., Longueuil, Canada

[21] Appl. No.: 211,715

[22] PCT Filed: Oct. 21, 1992

[86] PCT No.: PCT/CA92/00471

§ 371 Date: Jul. 6, 1994

§ 102(e) Date: Jul. 6, 1994

[87] PCT Pub. No.: WO93/08040

PCT Pub. Date: Apr. 29, 1993

[30] Foreign Application Priority Data

Oct. 23, 1991 [CA] Canada ................................. 2054042

[51] Int. Cl.⁶ ....................................... B32B 3/28
[52] U.S. Cl. ............................ 428/167; 428/120; 428/79; 428/101; 428/99; 428/166; 428/172; 428/192
[58] Field of Search ............................. 428/156, 99, 172, 428/192, 45, 81, 79, 101, 72, 120, 121, 166, 167, 174; 5/417; 296/97.23

[56] References Cited

U.S. PATENT DOCUMENTS 3,930,084  12/1975  Shields ........................ 428/67
4,804,567   2/1989  Reuben ........................ 428/79
4,828,898   5/1989  Bailey ......................... 428/88
4,871,602  10/1989  Luker .......................... 428/88

FOREIGN PATENT DOCUMENTS 1198466  12/1985  Canada.
0379630   8/1990  European Pat. Off..
2617102  12/1988  France.
2127290   4/1984  United Kingdom.

OTHER PUBLICATIONS

Patent Abstracts of Japan, vol. 008, No. 047, Mar. 1984, JP 58-202119.

Primary Examiner—Donald J. Loney
Attorney, Agent, or Firm—Foley & Lardner

[57] ABSTRACT

Disclosed is an automobile floor mat having a removable and reversible pan portion that snugly fits inside a central recessed area to collect contaminants. One side of the pan is provided with a plurality of diagonal ridges, the space between the ridges forming grooves to collect liquids. The other side of the pan may be constituted of an abrasive surface of the sand paper type.

4 Claims, 2 Drawing Sheets

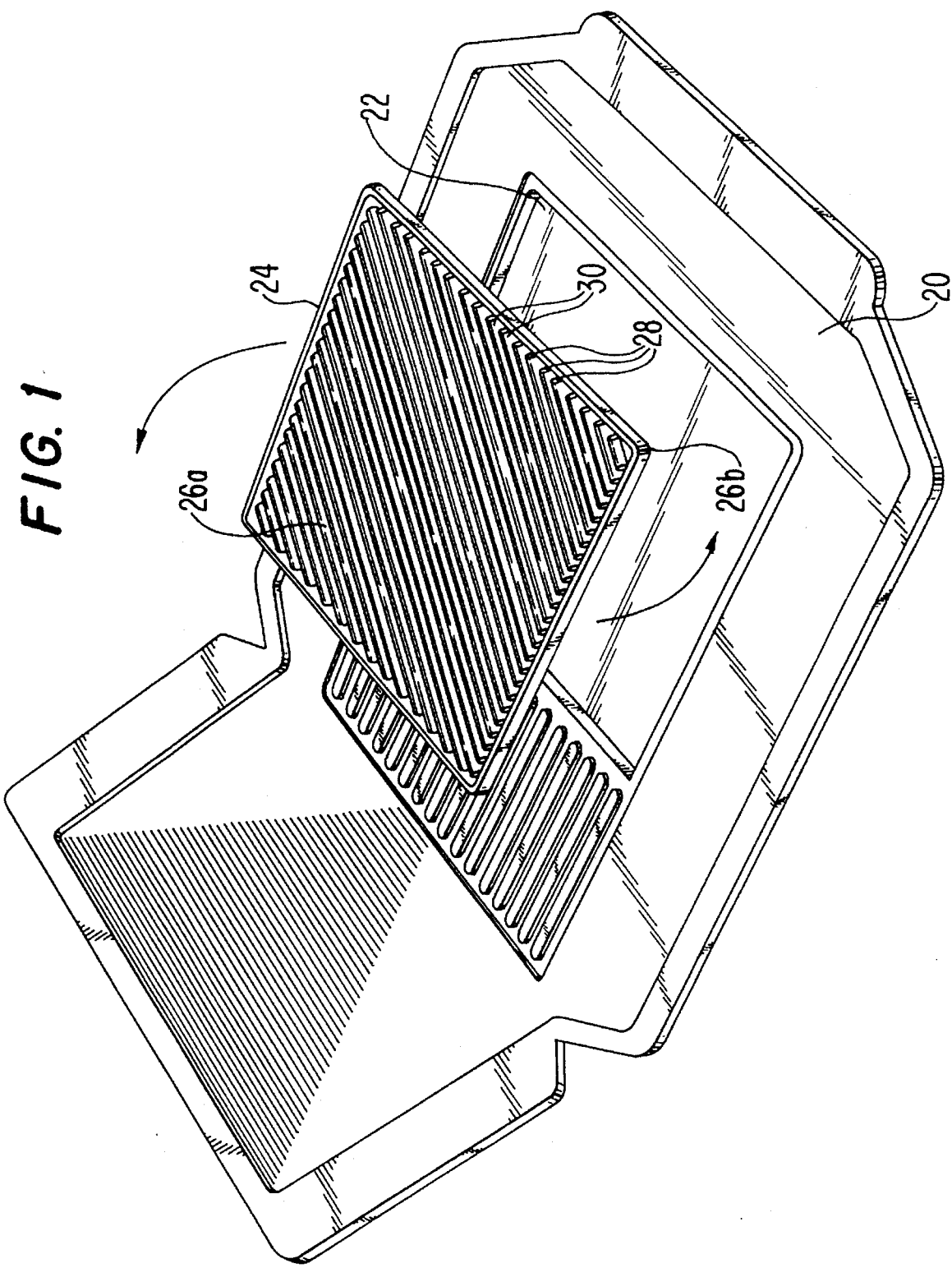

REVERSIBLE AUTOMOBILE FLOOR MAT

BACKGROUND OF THE INVENTION a) Field of the Invention

The present invention relates to an improvement in a reversible automobile floor mat. More particularly, the invention relates to a mat having a center pan portion which is reversible to adapt to different conditions of various seasons.

b) Brief Description of the Prior Art

Automobile floor mats are well known and used often to protect the carpeting in an automobile from the damage of calcium and sand, as well as the wear from the user's feet. Particularly, CA-A-1,198,466 describes a floor mat which comprises a central pan having diagonally disposed ribs where the fluid is collected between these ribs. Therefore, the pants of the user are protected from soaking in the fluids collected in the pan. However, the central portion is not required during the summer since less contaminants are carried from the feet of the user.

OBJECTS AND SUMMARY OF THE INVENTION

It is an object of the present invention to provide a floor mat that is usable both in winter and summer.

It is another object of the invention to provide a mat that does not have to be turned over entirely for its different uses.

It is a further object of the invention to provide a portion of the mat that is most soaked to be easily removable and cleanable out of the car.

In accordance with the invention there is provided an automobile floor mat comprising a substantially centrally disposed, downwardly recessed area in which a removable portion can be positioned, the removable portion being sized to fit into the recessed area and being detachably held therein by retaining means forming past of the removable portion and mat.

This mat is characterized in that the removable portion is reversible and postionable on the recessed area on any of its two sides, at least one of these two sides being shaped as a pan and comprising a plurality of spaced apart ridges, the space between each pair of ridges with in the pan forming a groove for collecting contaminants.

Preferably, only one side of the central pan portion comprises a plurality of ridges, the other side of the removable pan portion having an abrasive surface.

BRIEF DESCRIPTION OF THE INVENTION

In the drawings which illustrate a non restrictive embodiment of the invention:

FIG. 1 is an exploded perspective side view of a mat according to the invention;

Figure 2A:
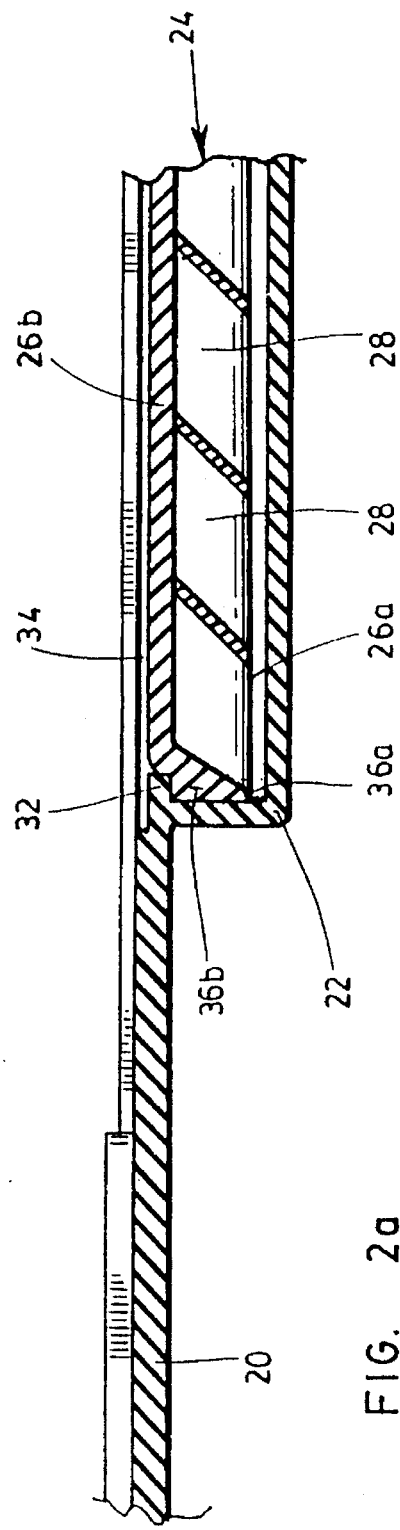
FIG. 2a is a cross-section view of the mat of FIG. 1 when cut along line 2—2 when the mat is positioned in the summer position.

FIG. 1 shows an automobile mat 20 which comprises a lower recessed area 22 substantially at the center of the mat 20. This recess area 22 is of such a size and depth as to receive a reversible pan portion 24 that fits in the recess area 22. As shown in FIG. 1, the pan portion 24 may be positioned in the recessed area 22 on any of its two sides 26a or 26b. A first side 26a of the pan portion comprises a plurality of spaced apart ridges 28, the space between each ridge 30 forming a recipient or groove to collect fluids or contaminants that adhere to the driver's feet such as salt, sand or snow (mostly during the winter). These grooves are preferably oriented diagonally with respect to the longitudinal axis of the mat, but this is not compulsory. The other side 26b of the reversible pan portion may also be made of these grooves, but preferably, it is made of an abrasive surface to scrape-off any contaminant adhering to the sole of the shoes. Such an abrasive surface may be sand paper or the like, to collect smaller contaminants that are adhering during the summer, such as dirt, sand or leaves.

FIG. 2a shows a cross-section view of the mat when the summer side 26b of the pan portion is set up. The pan portion 24 is inserted inside the recess area 22 of the mat 20 With its sand paper-like side 26b facing upwardly and the other side 26a resting on the bottom of the recessed area 22. Of course, the pan portion 24 is sized to fit snugly inside the recessed area 22 and is provided with retaining means to snap the portion in place. These retaining means comprise, on the one hand, an abutment rim 32 disposed around the periphery 34 of the recessed area, and, on the other hand, a shoulder 36a or 36b disposed around the periphery of the pan portion 24 on each of its sides 26a and 26b respectively.

The shoulder 36b abuts underneath the rim 32 when the pan portion 24 is snapped into the recessed area 22. Of course, the rim 32 should be resilient enough to allow insertion and retrieval of the pan portion 24 without too much difficulty and thereby, allow changing of the side, or retrieval to clean the pan portion 24.

Figure 2B:
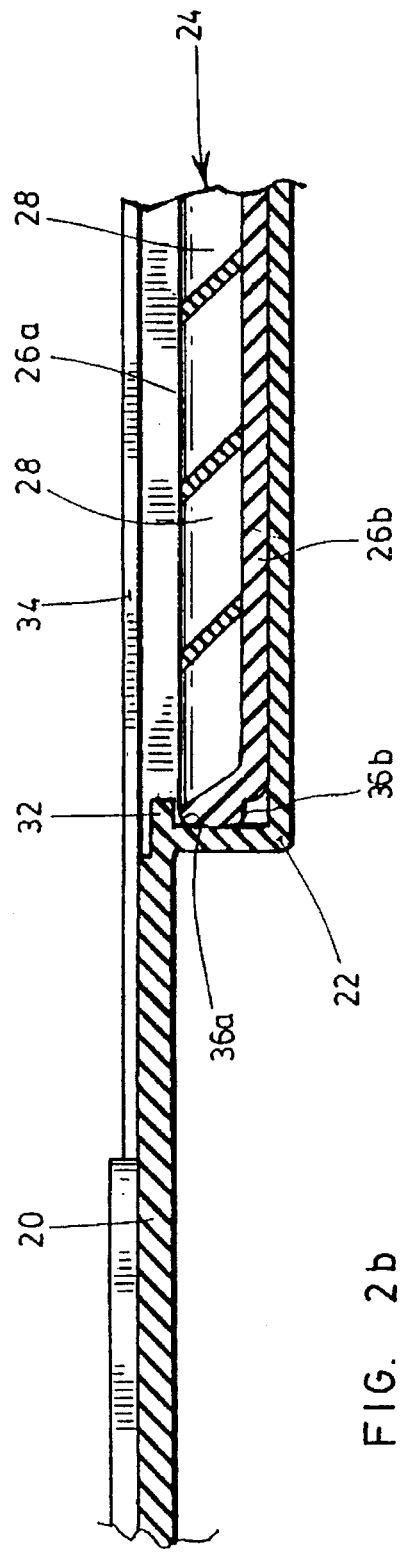
FIG. 2b is a cross-section view of the mat of FIG. 1 when cut along line 2—2 when the mat is positioned in the winter position.

FIG. 2b shows the mat when the winter side 26a of the pan portion 24 is up. The diagonal ridges 28 are now facing upwardly and the sand paper-like side rests on the bottom of the recessed area 22. The corresponding shoulder 36a is also positioned upwardly abutting underneath the rim 32 of the recessed area 22. The ridges 28 are of such a height as to be slightly lower than the periphery 34 of the recessed portion 22 so that any liquid contaminant is retained in the recessed area 22.

This automobile mat may be made of strong rubber, or of any other suitable polymer as will appear obvious to any person skilled in the art. Also, the mat can be provided in two or more different colors to make it more aesthetically appealing.

I claim:

1. The combination of:

(a) an automobile floor mat (20) comprising a substantially centrally disposed, downwardly recessed, flat bottomed area (22); and (b) a reversible portion (24) detachably mounted in said recessed area (22), said reversible portion (24) being sized to fit into said recessed area (22) and be detachably held therein by retaining means (32,36) forming part of said reversible portion and said mat, said reversible portion having two opposite sides (26a, 26b), at least one of said two opposite sides being shaped as a pan (26a) and comprising a plurality of spaced apart ridges (30), the space between adjacent ridges within said pan forming a groove for collecting contaminants.

2. The combination according to claim 1, wherein said retaining means (32,36) comprise an abutment rim (32) disposed around the periphery (34) of said recessed area (22) and a shoulder (36a,36b) disposed around the periphery of each side (26a,26b) of said reversible portion (24), said shoulder abutting underneath said rim when said reversible portion (24) is inserted into said recessed area, said rim and said shoulder being resilient to allow insertion and retrieval of said reversible portion on one side or the other.

3. The combination according to claim 1, wherein the other side (26*b*) of said reversible portion (24) has an abrasive surface.

4. The combination of claim 2, wherein said mat (20) and reversible portion (24) are provided in at least two different colors to make them aesthetically appealing.

\* \* \* \* \*